United States Patent
Gravino et al.

(10) Patent No.: US 8,457,602 B2
(45) Date of Patent: Jun. 4, 2013

(54) HYBRID COMMUNICATIONS MAILBOX

(75) Inventors: Douglas David Gravino, Roswell, GA (US); Radhakrishnan Gopinath, Alpharetta, GA (US); Michael L. Poffenberger, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 79 days.

(21) Appl. No.: 12/941,327

(22) Filed: Nov. 8, 2010

(65) Prior Publication Data

US 2012/0115444 A1 May 10, 2012

(51) Int. Cl.
 *H04M 11/10* (2006.01)
(52) U.S. Cl.
 USPC ....... 455/413; 455/411; 455/412.1; 379/67.1; 379/88.28; 370/259; 370/271
(58) Field of Classification Search
 USPC ............... 455/413, 414.1, 405, 466, 552.1, 455/456.1, 411, 412.1; 379/88.12, 201.01, 379/224, 44, 88.22, 67.1, 88.28; 370/331, 370/335, 259, 271; 709/224; 704/270, E15.001, 704/200, 278
 See application file for complete search history.

(56) References Cited

U.S. PATENT DOCUMENTS

| | | | |
|---|---|---|---|
| 7,007,085 B1 * | 2/2006 | Malik | 709/224 |
| 7,532,710 B2 * | 5/2009 | Caputo et al. | 379/88.18 |
| 7,801,286 B1 * | 9/2010 | Thentheruperai et al. | 379/88.25 |
| 8,060,068 B1 * | 11/2011 | Mangal | 455/415 |
| 2002/0154745 A1 * | 10/2002 | Shtivelman | 379/88.12 |
| 2003/0059004 A1 * | 3/2003 | Jiang et al. | 379/88.17 |
| 2004/0203798 A1 * | 10/2004 | Bedingfield | 455/445 |
| 2006/0222152 A1 * | 10/2006 | Elias et al. | 379/88.13 |
| 2006/0239429 A1 * | 10/2006 | Koch et al. | 379/201.01 |
| 2006/0262911 A1 * | 11/2006 | Chin et al. | 379/88.18 |
| 2007/0026852 A1 * | 2/2007 | Logan et al. | 455/422.1 |
| 2009/0041211 A1 * | 2/2009 | Bolden et al. | 379/88.12 |

* cited by examiner

*Primary Examiner* — Mahendra Patel
(74) *Attorney, Agent, or Firm* — Merchant & Gould (57) ABSTRACT

Hybrid communications voicemail systems and methods are disclosed. A wireline telephone number may be operatively associated with a wireless telephone voicemail box such that calls placed to the wireline telephone number and subsequently routed to voicemail may be routed to the wireless telephone voicemail box. Thus, the user of both wireline and wireless telephones may check voicemail messages at a single wireless voicemail box. Parents or supervisors may check voicemail messages or converted text messages deposited for children or employees at the single wireless voicemail box. A wireless telephone user may allow calls to be routed to his/her wireless telephone from his/her wireline telephone if he/she cannot be reached at the wireline telephone or as designated by the user.

20 Claims, 3 Drawing Sheets

HYBRID COMMUNICATIONS MAILBOX

BACKGROUND

With the advent of modern communications systems, many people utilize a variety of different communications systems for work, home and leisure activities. A given person may utilize a wireline telephone system at work or home, and simultaneously, the person may utilize a wireless telephone at work, at home, while driving, or while engaged in a variety of leisure activities. One problem associated with the use of both wireline and wireless telephone systems is that the user receives voicemail messages at both systems requiring him/her to constantly check both systems. Another problem associated with the use of both wireline and wireless telephone systems is an inability of parents and/or supervisors to exercise supervision over voice messages left on wireless voicemail systems for their children, employees, or charges. Another problem associated with the use of both wireline and wireless systems is where a user of a wireless system would like to be contacted at his/her wireless telephone device when he cannot be reached at his/her wireline telephone device, but the user would rather not release his/her wireless telephone number, and the user would like to exercise control over when and from whom he/she receives calls at the wireless telephone.

It is with respect to these and other considerations that the present invention has been made.

SUMMARY

The above and other problems are solved by a hybrid communications voicemail system and method. According to embodiments, a wireline telephone number may be operatively associated with a wireless telephone voicemail box such that calls placed to the wireline telephone number and subsequently routed to voicemail may be routed to the wireless telephone voicemail box instead of a wireline voicemail box. Thus, the user of both wireline and wireless telephones may check voicemail messages at a single wireless voicemail box.

According to other embodiments, parents or supervisors may check voicemail messages or converted text messages deposited for children or employees at the single wireless voicemail box. Thus, parental and/or supervisory control or management over voicemail and text messaging is provided.

According to other embodiments, a wireless telephone user may allow calls to be routed to his/her wireless telephone from his/her wireline telephone any time he/she cannot be reached at the wireline telephone or at times designated by the user.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to a hybrid communications voicemail system and method. Voicemail messages intended for a wireline voicemail box may be routed to a wireless voicemail box associated with a called party's wireless telephone device. Thus, the called party may receive, review and dispose of voicemail messages at a single wireless voicemail box. Parental and/or supervisory control may be exercised over a child's or employee's wireless voicemail box. In addition, a called party may allow calls made to and not answered at his wireline telephone to be routed to him/her at his/her wireless telephone, and thus, the called party may control from whom and when calls are directed to him/her at the wireless device. According to other embodiments, the foregoing systems and methods may function in a reverse manner where voicemail messages intended for a wireless voicemail box may be routed to a wireline voicemail box and where calls made to and not answered at a wireless telephone may be routed to a wireline telephone.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
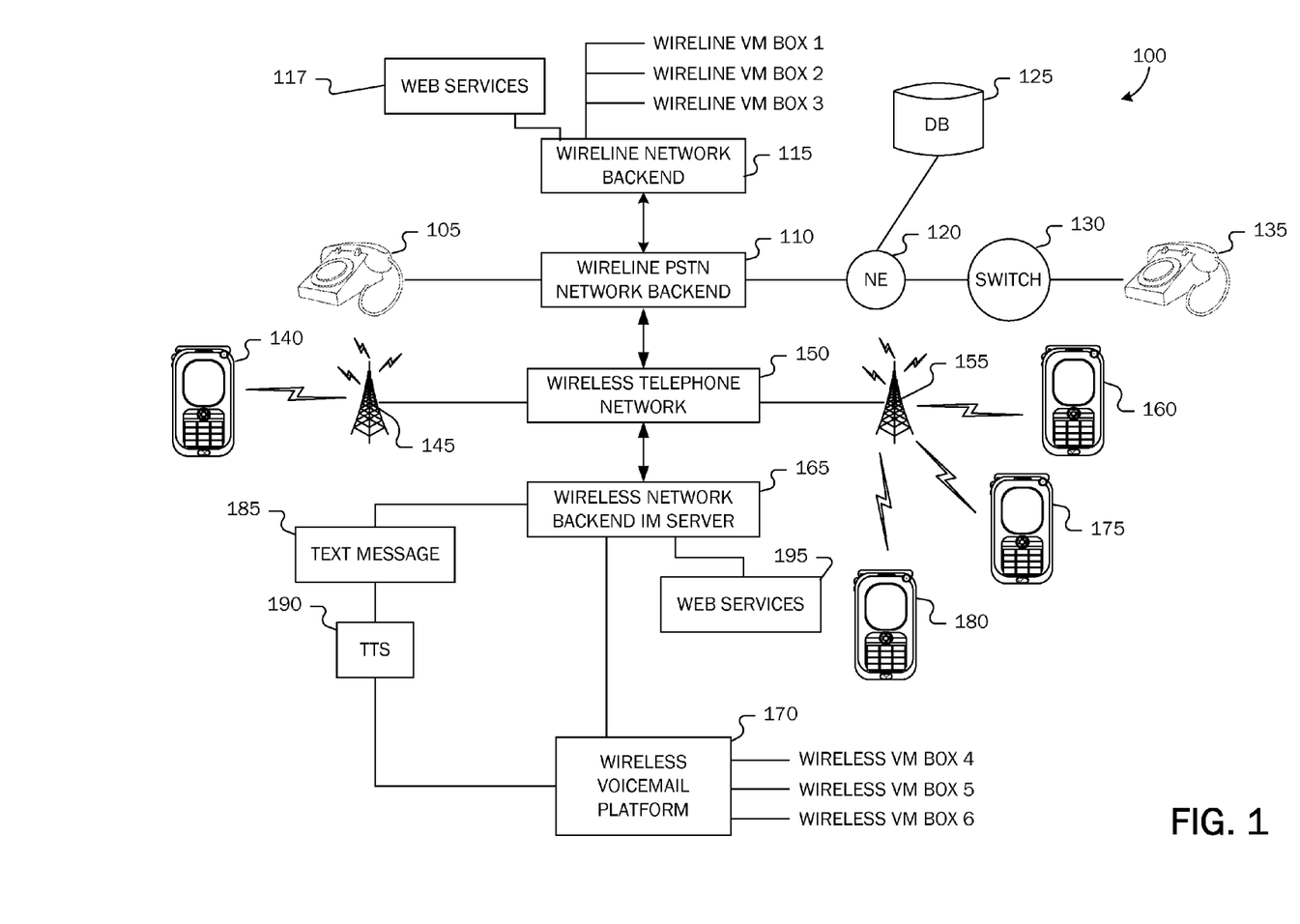
FIG. 1 illustrates a system architecture with which embodiments of the present invention may be practiced.

FIG. 1 illustrates a system architecture with which embodiments of the present invention may be practiced. The system architecture 100 illustrated in FIG. 1 provides for both a wireline telephone network 110 and a wireless telephone network 150. The wireline telephone network 110 is operative to send and receive wireline voice and data traffic across the wireline network to end point devices 105, 135. The end point devices 105, 135 are illustrative of wireline telephones for sending and receiving wireline voice traffic.

A network element 120 is an intelligent network element operative to process voice and data calls to and from end point devices 105 and 135 via a switch 130, also known as a service switching point. As should be appreciated, although shown as a separate element, the network element 120 may operate as functionality of the switch 130 or may be part of a feature server device operatively associated with the wireline network backend 115 or within a voicemail platform. A database 125 is illustrated in operative connection to the network element 120 for maintaining information associated with call or data processing to the end points 105, 135. For example, when a telephone call is directed to the wireline telephone 135, the call may be passed through the network element 120 for a determination as to whether any specialized processing is required for calls directed to the wireline telephone 135. For example, a call directed to the wireline telephone 135 may pass through the network element 120 which may in turn query the database 125 to determine whether any special call processing, for example, call forwarding, voicemail services, and the like are provisioned on the line to the wireline telephone 135.

According to embodiments, the wireline network 110 may be in the form of a publicly switched telephone network (PSTN) operating over a variety of transmission means including copper cabling, fiber optic cabling, microwave transmission, or other suitable transmission means. The wireline telephone network 110 may also be in the form of other wireline networks, including cable television-enabled networks, wherein cable-based telephony is transmitted to an end point wireline telephone 135 via a cable modem associated with the wireline telephone 135.

The wireline network backend 115 is illustrative of one or more backend services associated with the wireline network 110, including accounting services, billing services, subscriber profile services, specialized call processing services, and the like. As illustrated in FIG. 1, the wireline network backend 115 may include a voicemail system for storing voicemail messages directed to wireline telephones 105, 135 for subscribers to the wireline network 110. For example, the voicemail boxes 1, 2, 3 may be illustrative of voicemail boxes associated with three different wireline network subscribers. Alternatively, the first voicemail box 1 may be associated with a general voicemail box associated with an end point wireline telephone 105, 135, and the voicemail boxes 2 and 3 may be illustrative of sub voicemail boxes operating underneath the primary mailbox 1. For example, voicemail box 1 may be a primary voicemail box of a home, business or other facility, and the voicemail boxes 2, 3 may be sub-voicemail boxes operating underneath the primary voicemail box. For example, in a given household, a sub-voicemail box 2 may be associated with a first member of a family, and a sub-voicemail box 3 may be associated with a second member of the family. Accordingly, voice calls directed to the wireline telephones 105, 135 that are passed to voicemail may be passed through a switch 130, a network element 120 to the wireline network backend 115 and stored in an appropriate or selected voicemail box 1, 2, 3.

The web services system 117 is illustrative of a web-based interface through which a subscriber to the wireline telephone network 110 may communicate with the wireline network backend 115 for subscribing to additional wireline telephone network features or functionalities or for modifying existing features or functionalities. According to embodiments of the present invention, the web services system 117 may be utilized by a subscriber to the wireline telephone network 110 for provisioning on a service line to a desired wireline telephone 105, 135 a feature allowing for voice messages directed to a wireline voicemail box 1, 2, 3 to be redirected to a wireless voicemail box 4, 5, 6 associated with the wireless voicemail platform 170, described below. In addition, the web services system 117 may be utilized by a subscriber of the wireline network 110 for allowing calls directed to a given wireline voicemail box 1, 2, 3 associated with the wireline network backend 115 to be redirected to a wireless device 140, 160, 175, 180, described below. As should be appreciated, special functionalities, features, and instructions provisioned on a given wireline telephone line directed to a wireline end point telephone 105, 135 may be stored in the data base 125 and may be accessed by the network element 120, described above, when calls are directed to an associated wireline telephone 105, 135. As should be appreciated, the web services system 117 is only one example of an interface for allowing a subscriber to communicate with the wireline telephone network 110 for adding, deleting, modifying, or providing instructions for the operation of functionalities and features associated with the wireline telephones 105, 135. That is, other suitable means for communicating subscriber instructions to the wireline network 110 may be utilized, including voice communications, traditional mail communications, electronic mail communications, etc. with personnel at the wireline network backend 115, and the like.

Referring still to FIG. 1, the wireless telephone network 150 is illustrative of a network for passing wireless voice, text messaging, instant messaging, and wireless data via wireless transmission points 145, 155 to a variety of wireless devices 140, 160, 175, 180. As should be appreciated, the wireless devices 140, 160, 175, 180 may be in the form of wireless telephones, wireless personal digital assistants (PDA), wireless computing devices, or any wireless device capable of receiving wireless transmissions such as wireless voice, wireless text messages, wireless instant messages, wireless data, and the like.

The wireless network backend 165 is illustrative of a backend service system associated with the wireless telephone network 150 for providing various services in association with the wireless telephone network 150. For example, the wireless network backend may include accounting services, billing services, subscriber profile services, specialized call processing services, and the like.

A wireless voicemail platform 170 is illustrative of a voicemail system associated with the wireless network 150 for storing voicemail messages directed to a wireless end point telephone device 140, 160, 175, 180. Voicemail boxes 4, 5, 6 may be illustrative of three different voicemail boxes associated with three different wireless telephone devices 140, 160, 175, or the voicemail boxes 4, 5, 6 may be illustrative of three voicemail boxes associated with a single wireless telephone 140, wherein a first wireless voicemail box 4 is illustrative of a primary voicemail box associated with the wireless telephone 140, and wherein the wireless voicemail boxes 5 and 6 are illustrative of sub-voicemail boxes associated with the same wireless device 140. For example, while the voicemail box 4 may be a primary voicemail box for a wireless telephone 140, the sub-voicemail boxes 5, 6 may be designated as private voicemail boxes for two individual users of the wireless telephone 140.

The text message platform 185 is illustrative of a system associated with the wireless telephone network 150 for receiving and storing text messages passed to and from wireless devices 140, 160, 175, 180. A text-to-speech (TTS) module 190 is illustrative of a module for transforming text messages stored in association with the text message platform 185 into speech, audio or voice-based message files that may be stored in the wireless voicemail platform 170 in association with a given wireless voicemail box 4, 5, 6. For example, in accordance with embodiments of the present invention, a text message sent to a wireless device 140, 160, 175, 180 may be transformed from text-to-speech, and the resulting speech, audio or voice-based message file may be stored in a designated voicemail box associated with a given user of the wireless device 140, 160, 175, 180. Thus, text messages may be reviewed from a designated voicemail box in the same manner as voice messages may be reviewed from a wireless voicemail box 4, 5, and 6. According to other embodiments, text messages may be stored as text within a voicemail system. A stored text message may be retrieved and displayed in a user interface associated with the wireless voicemail platform, for example, at one of the wireless devices 140, 160, 175, 180. For example, stored text messages may be retrieved and displayed via a visual voicemail interface operated in association with the wireless voicemail platform. Alternatively stored text messages may be transformed from text-to-speech in real time upon selection of the stored text messages.

The web services system 195 is similar to the wireline web services system 117, described above, and is illustrative of a web-based interface through which a subscriber to the wireless telephone network 150 may communicate with the wireless network backend 165 for subscribing to additional wireless telephone network features or functionalities or for modifying existing features or functionalities. According to embodiments of the present invention, the web services system 195 may be utilized by a subscriber to the wireless telephone network 150 for coordinating the routing of voicemail messages initially directed to the wireline voicemail boxes to corresponding wireless voicemail boxes as described herein. For example, if the wireless telephone network is operated by a different communications services provider than the wireline telephone network, a subscriber of both services may need to communicate his/her instructions to both services via the respective web services systems 117 and 195 (or other suitable means for communicating with the disparate communications systems). In addition, the web services system 195 may be utilized by a subscriber of the wireless network 150 for allowing calls directed to a given wireline telephone 105, 135 to be redirected to a wireless device 140, 160, 175, 180, described below. As should be appreciated, the web services system 195 is only one example of an interface for allowing a subscriber to communicate with the wireless telephone network 150 for adding, deleting, modifying, or providing instructions for the operation of functionalities and features associated with the wireless telephones 140, 160, 175, 180. That is, other suitable means for communicating subscriber instructions to the wireless network 150 may be utilized, including voice communications, traditional mail communications, electronic mail communications, etc. with personnel at the wireless network backend 170, and the like.

In addition, the web services system 195 associated with the wireless network backend 165 may be utilized for allowing subscribers to the wireless network 150 to subscribe to parental or supervisory controls associated with wireless telephones 140, 160, 175, 180. According to embodiments of the present invention, a subscriber to the wireless telephone network 150 may utilize the web services system 195 for accessing one or more wireless voicemail boxes 4, 5, 6 associated with the wireless voicemail platform 170 for exercising parental and supervisory control over voice messages and text to speech text messages stored therein. In addition, the web services system 195 may be utilized by a subscriber to the wireless telephone network 150 for dictating from whom and when telephone calls may be directed to a wireless telephone 140, 160, 175, 180 when the subscriber cannot be reached at his/her wireline telephone 105, 135.

Figure 2:
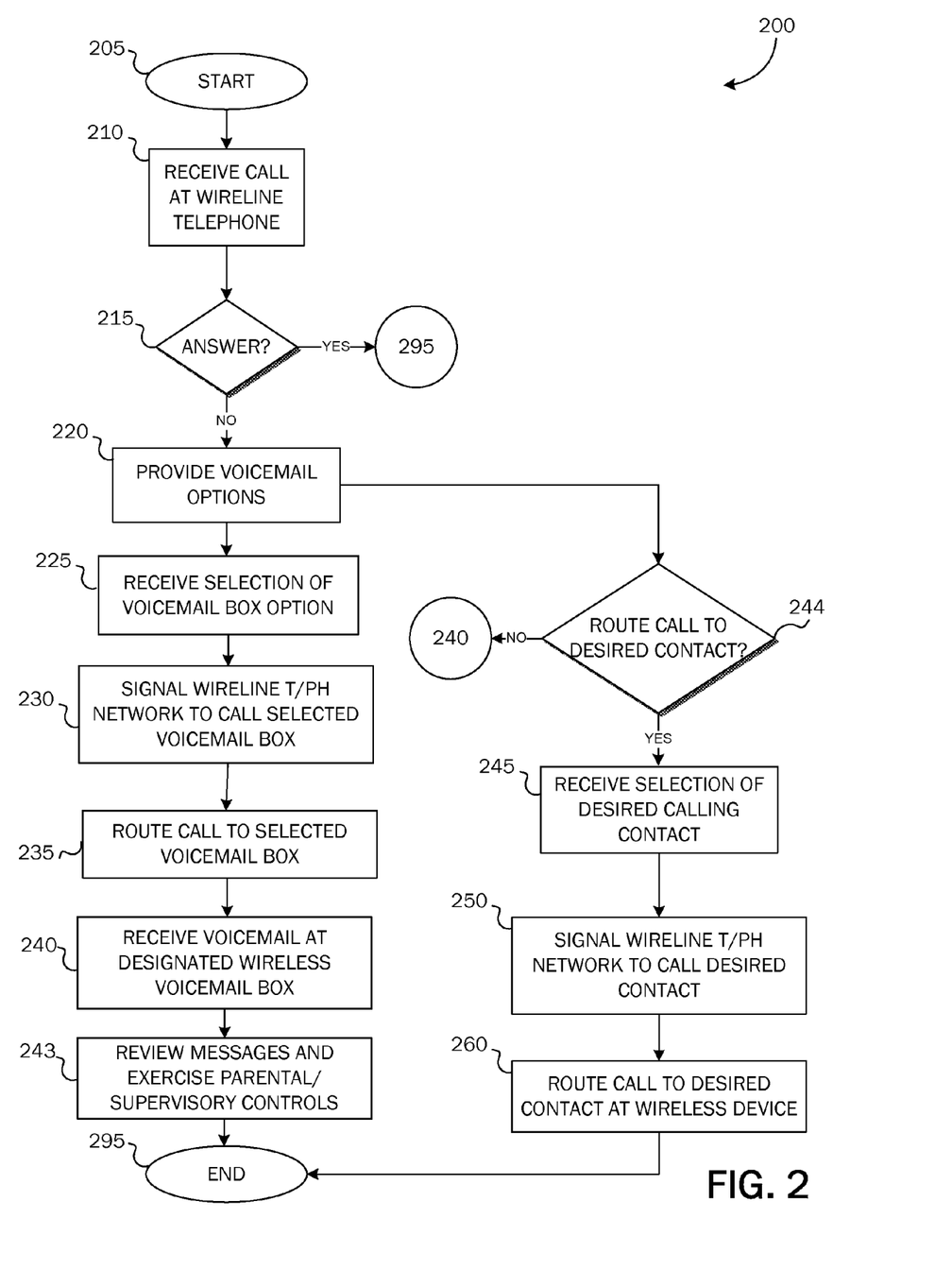
FIG. 2 is a flow diagram illustrating a routine for routing calls directed to a wireline voicemail to a wireless voicemail or wireless telephone.

Having described a system architecture with which embodiments of the invention may be practiced with reference to FIG. 1, FIG. 2 is a flow diagram illustrating a routine for routing calls directed to a wireline voicemail to a wireless voicemail or wireless telephone. For purposes of the description of FIG. 2, consider an example use case where three members of a household receive wireline telephone calls through the wireline network 110 at wireline telephone 135, as illustrated and described with reference to FIG. 1. Consider also that each of the three members of the household is associated with a sub-voicemail box 1, 2, 3 respectively for receiving voicemail messages directed to them personally. For example, when a caller calls one of the three members of the household at the wireline telephone 135 and the call is not answered, without the advantages of embodiments of the present invention, the calling party may receive a prompt such as "press 1 to leave a message for party 1, press 2 to leave a message for party 2, and press 3 to leave a message for party 3." As should be appreciated, if the calling party presses 1, the calling party's voicemail message may be deposited in wireline voicemail box 1 associated with called party 1, if the calling party presses 2, the calling party's voice message would be deposited in wireline voicemail box 2 associated with called party 2, and so on.

Continuing with the example use case, when the call directed to the wireline telephone 135 reaches the network element 120, the network element 120 may query the database 125 for any special call processing features or services provisioned on the line to the called telephone 135. As a result of that query by the network element 120 to the database 125, a determination may be made that the unified multiple voicemail box configuration described herein is available to allow the calling party to leave voice messages for different members of the called telephone household in different voicemail boxes associated with each member of the called telephone household.

As will be described below with reference to FIG. 2, according to embodiments of the present invention, the wireline network 110 and wireline network backend 115 may be configured by members of the called telephone household to route voice messages intended for the wireline voicemail boxes 1, 2, 3 associated with the wireline network backend 115 to wireless voicemail boxes 4, 5, 6 associated with the wireless network 150 and associated with the wireless voicemail platform 170, as described above with reference to FIG. 1. That is, voicemail messages directed to a wireline voicemail box associated with a first called party at the wireline telephone 135 may be routed to and stored in a wireless voicemail box associated with the first called party's wireless telephone 160, voicemail messages directed to a wireline voicemail box of a second called party may be routed to a wireless voicemail box associated with the second called party's wireless telephone 175, and so on. Thus, each of the called parties may receive, review and process voice messages directed to them at the wireline telephone 135 and to their respective wireless telephone 140, 160, 175, 180 at a single wireless voicemail box rather than having to receive, review and process voicemail messages at both a wireline voicemail box and at a wireless voicemail box. In addition, as will be described below, embodiments of the present invention also allow for more advanced call processing and for parental and/or supervisory controls over voicemail and text messaging routed to and deposited in a called party wireless voicemail box.

Referring then to FIG. 2, the routine 200 begins at start operation 205 and proceeds to operation 210 where a called party receives a call at a wireline telephone 105, 135. At operation 215, a determination is made as to whether the called party answers the call received at the wireline telephone. If the call is answered, the routine ends at operation 295, and the called party takes and disposes of the call as desired.

If the call is not answered at operation 215, the routine proceeds to operation 220, and the calling party is provided an option for leaving a voice message for the desired called party. If the called wireline telephone 135 is associated with a single called party, for example, a home or apartment, business or other facility having a single voicemail box and no sub-voicemail boxes, the routine may proceed directly to operation 230, described below. On the other hand, if multiple potential called parties may be called at the called wireline telephone 105, 135, for example, multiple members of a household, multiple employees of a business, and the like, then at operation 220 one or more sub-voicemail box options may be provided to the calling party. For example, the calling party may receive a prompt such as "press 1 to leave a message for Joe, press 2 to leave a message for Sarah, press 3 to leave a message for Susan, and so on." As described above, according to embodiment, an intelligent call processing component such as the network element 120 may provide the voicemail box options after a database search to determine those features and/or options that are provisioned on the called party line. As was mentioned above, network element 120 may be a telephone switch/feature server device and may be a functionality within a telephony switch 130, wireline network backend 115 or within a voicemail platform.

At operation 225, a selection of a particular voicemail box is received from the calling party. For example, if the calling party desires to speak with a particular member of a household, for example, John, then the calling party may press the appropriate digit on the calling party telephone for leaving a message for the desired called party. At operation 230, in response to receipt of the selected voicemail box from the calling party, a determination is made as to whether any specialized call processing features or functionalities should be applied in response to the selection received from the calling party. According to embodiments of the present invention, a determination is made that voicemail messages directed to the selected wireline voicemail box are to be routed to a prescribed wireless voicemail box to allow the recipient of the voicemail message to receive, review and process voicemail messages at a single wireless voicemail box. That is, a determination is made as to whether the selected wireline voicemail box is mapped to an associated wireless voicemail box to which the call may be routed. According to one embodiment, the determination may include querying the wireline telephone system (e.g., querying the database 125) for one or more instructions for processing calls directed to the wireline telephone.

At operation 230, signaling from the wireline telephone network, for example, via the network element 120 causes the incoming call to be routed to a prescribed wireless voicemail box associated with the called party. According to one embodiment, a wireless telephone directory number for the wireless voicemail box associated with the called party is retrieved from the database 125 by the network element 120, and the call is routed to the designated wireless voicemail box by the wireline telephone network 110 by placing a call from the calling party to the wireless voicemail box in the same manner in which the wireline network 110 would process any call from any wireline telephone 105, 135 to a wireless network number (and associated device). For example, if the calling party desires to leave a voicemail message for a particular member of a called household, for example, John, then at operation 230, signaling from the wireline telephone network may cause the incoming call to be directed to a wireless voicemail box at the wireless voicemail platform 170 associated with a wireless telephone 140, 160, 175, 180 operated by the desired called party, for example, John. As described above with reference to FIG. 1, call processing instructions followed by the wireline telephone network 110 for routing the incoming call to the designated wireless voicemail box may be provided to the wireline network 110 via a communication from the called party via the web services system 117 or via any other suitable means for allowing a called party to communicate with the wireline network 110 for providing instructions on how incoming calls should be processed, as described herein. As should be appreciated, call routing instructions as described above may be set up and defined by a called party in advance of receiving incoming calls.

At operation 235, the incoming call is routed to the wireless voicemail box associated with the particular called party. At operation 240 a voicemail message from the calling party is received at the designated wireless voicemail box.

At operation 243, the called party may review messages left in his/her wireless voicemail box for calls place to both his wireline telephone 135 and to his/her corresponding wireless telephone, and thus the called party does not have to access two separate voicemail boxes. In addition, a parent and/or supervisor of the called party household, business, or other facility may exercise parental and/or supervisory controls over voice messages routed to one or more wireless voicemail boxes, as described above. A first form of parental and/or supervisory control may be in the form of providing a parent or supervisor access to the wireless voicemail boxes of each of the wireless telephones 140, 160, 175, 180 to allow the parent and/or supervisor to review voicemail messages left for other members of the parent's household, other members of a supervisor's business, and the like. According to one embodiment, the parent and/or supervisor may be granted access to each of the disparate wireless voicemail boxes for reviewing messages left therein. Alternatively, the voicemail platform 170 may be operative to allow the parent or supervisor to dial a single wireless voicemail box number, wherein the calling parent or supervisor may be provided options for reviewing messages from a variety of wireless voicemail boxes. In either case, a determination may be made as to whether the parent or supervisor is authorized to review messages. For example, the parent or supervisor may be required to enter a password or other form of authentication to gain access to the wireless voicemail box(es) of interest. Such a password or authentication credential may be set up by the parent or supervisor via the web services systems 117, 195, described above. Other forms of authentication may be utilized, for example, allowing access to prescribed voicemail boxes from recognized calling numbers operated by parents or supervisors. For example, when a parent and/or supervisor dials the wireless voicemail platform 170, he/she may be provided with options such as "to review voicemail messages left for a first called party, press 1, to review voicemail messages left for a second called party, press 2, and so on."

According to another embodiment, parental and/or supervisory control may be exercised in a manner that allows the parent and/or supervisor to dictate when and from whom voicemail messages may be directed to the wireless voicemail boxes of supervised household members and/or employees. That is, through interaction with the wireline network 110 via the web services system 117 or other suitable communications means, or through interaction with the wireless network 150 via the web services system 195 or other suitable communications means for communicating with the wireless network, the parent and/or supervisor may provide call processing instructions that dictates times of day that voicemail messages may be directed to supervised wireless voicemail boxes and from whom (for example, from which calling directory numbers) voicemail messages may be received.

In addition, as described above with reference to FIG. 1, text messages directed to the wireless telephones 140, 160, 175, 180 supervised by a given parent and/or supervisor may be automatically converted to audio or speech files using a text to speech converter 190. The text messages transformed to audio or speech files may be deposited in the wireless voicemail boxes associated with the supervised wireless telephones 140, 160, 175, 180, and the parent and/or supervisor may thus review deposited text messages in the same manner as he/she may review and supervise deposited voice messages.

As described above, according to another embodiment, when a call is received at a wireline telephone 135 and the called party may not be reached, instead of routing the call to the called party's wireless voicemail box, the call may be routed to the called party's wireless telephone 140, 160, 175, 180 to allow the called party to take the call. This allows the called party to seamlessly receive calls at the alternate device without releasing the wireless device telephone number, and it allows the called party to control from whom and when calls may be routed to the wireless device. Routing may follow a find me/follow me type of service, wherein a call may be routed first to a wireline telephone 135. If the call is not answered, then it may be routed to a wireless telephone 140, 160,175,180. Alternatively, both a wireline telephone 135 and a wireless telephone 140,160,175,180 may ring simultaneously. The first device to be answered is connected.

Referring back to operation 220, in addition to providing one or more voicemail boxes for receiving voice messages directed to called parties, in accordance with embodiments of the present invention, a calling party may also be provided with options for connecting to a desired called party at an alternate telephone device, for example, at the desired called party's wireless telephone 140, 160, 175, 180. That is, in addition to providing the calling party with prompts such as "press 1 to leave a message for John, press 2 to leave a message for Sarah," additional prompts may be provided to allow the calling to connect to the desired called party. For example, a secondary prompt may be provided such as "to connect to John, press 4, to connect to Sarah, press 5," and so on. As should be understood, the called parties may provide instructions to the wireline telephone network 110 and to the wireless network 150 for processing such calls in the same manner as described above for processing voicemail messages. That is, the called parties may communicate with the wireline and wireless networks 110, 150 for providing call processing instructions.

At operation 244, a determination is made as to whether the call may be routed to the desired contact as selected by the calling party. For example, the desired called party may have provided call processing setup instructions to the wireline telephone network 110 that no calls should be routed to the desired called party wireless telephone 160 after 9:00 p.m., or the desired called party may have instructed the wireline telephone network 110 that calls should not be routed to the desired called party's wireless telephone 160 during business hours when all incoming calls should be directed to the called party's wireline telephone 135 only. Alternatively, the desired called party may have provided the wireline telephone network 110 with a restrictive list of calling parties from whom calls may be routed to the called party's wireless telephone 160 according to embodiments described herein. According to another embodiment, call processing setup instructions may be defined, wherein telephone calls received from particular calling parties may receive preferred treatment. For example, a calling party who may be defined as a preferred treatment calling party may be presented with a wireline-to-wireless transfer option anytime of the day, whereas a calling party who may not be defined as a preferred treatment calling party may only get a wireline-to-wireless option during a specified time (e.g., business hours).

At operation 244, a determination is made as to whether the incoming call may be routed to the desired called party's wireless telephone 160. If a call from the particular calling party may not be routed as selected, or if a call at the time of the incoming call may not be routed to the desired called party according to instructions provided to the wireline telephone network by the desired called party, the routine proceeds to operation 240 where the calling party may leave a voicemail message for the desired called party, as described above.

If the call from the calling party may be routed to the desired called party, then the routine proceeds to operation 245. At operation 245, if a selection is received by the calling party to connect the call to the desired called party at an alternate telephone device, the routine proceeds to operation 250, and the wireline telephone network is signaled to route the incoming call to the alternate telephone device. According to embodiments, when the wireline telephone call is directed to the initially called wireline telephone 105, 135, the intelligent network component associated with the wireline network, for example, the network element 120, may query the database 125 for call processing instructions. Once the selection is received at operation 245 designating that the call should be connected to a particular called party rather than routing the call to a designated voicemail box, the wireline network via the network element 120 may route the incoming call to the designated alternate telephone device associated with the selected called party. For example, if a selected called party is associated with the wireless telephone 160, then at operation 250, the wireline network 110 will be signaled to route the call to the designated wireless telephone.

Figure 3:
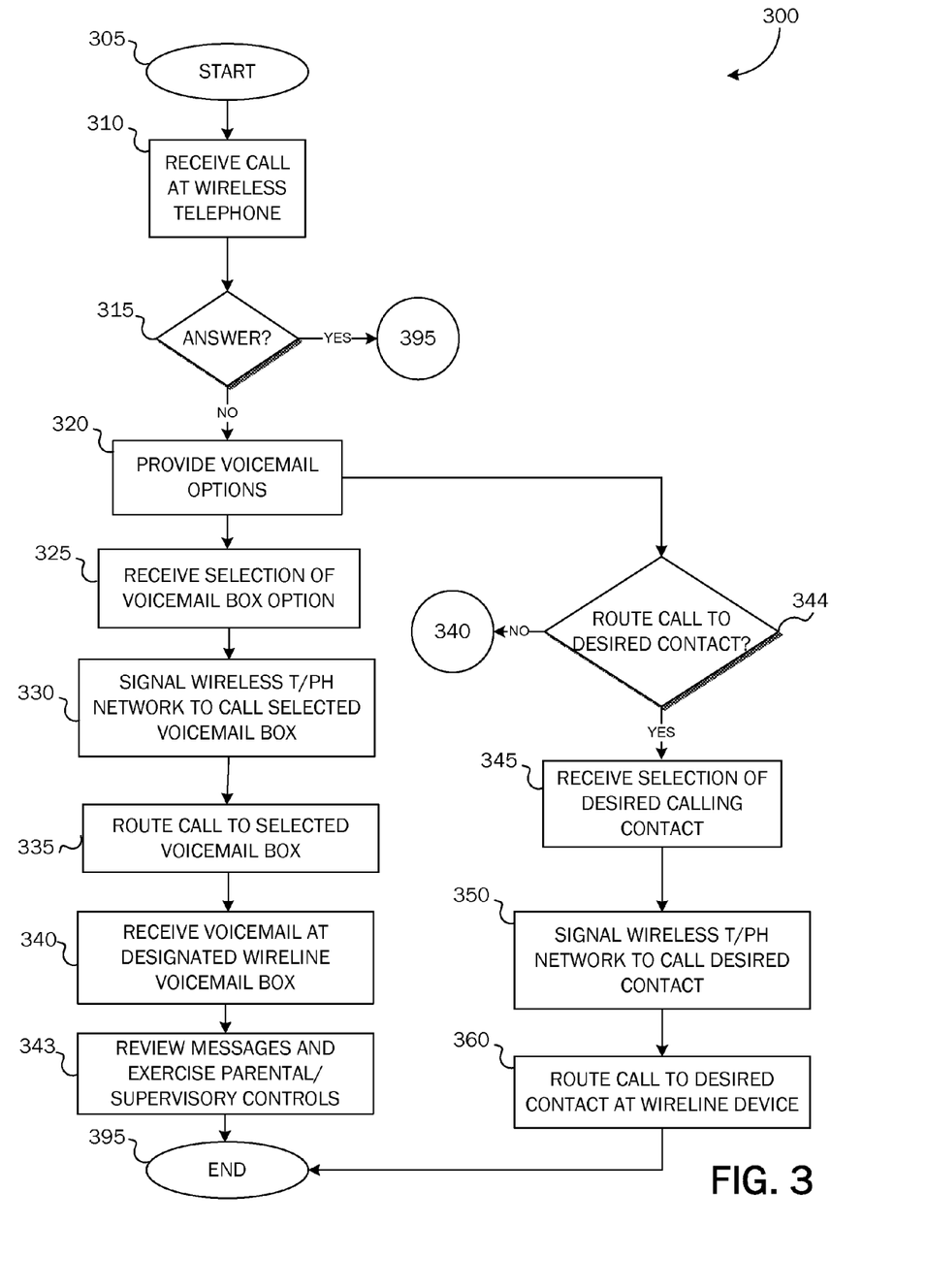
FIG. 3 is a flow diagram illustrating a routine for routing calls directed to a wireless voicemail to a wireline voicemail or wireline telephone.

As briefly described above, the foregoing systems and methods may function in a reverse manner where voicemail messages intended for a wireless voicemail box may be routed to a wireline voicemail box and where calls made to and not answered at a wireless telephone may be routed to a wireline telephone. FIG. 3 is a flow diagram illustrating a routine for routing calls directed to a wireless voicemail to a wireline voicemail or wireline telephone.

Referring then to FIG. 3, the routine 300 begins at start operation 305 and proceeds to operation 310 where a called party receives a call at a wireless telephone/device 140, 160, 175, 180. At operation 315, a determination is made as to whether the called party answers the call received at the wireless telephone. If the call is answered, the routine ends at operation 395, and the called party takes and disposes of the call as desired.

If the call is not answered at operation 315, the routine proceeds to operation 320, and the calling party is provided an option for leaving a voice message for the desired called party. If the called wireless telephone is associated with a single called party, having a single voicemail box and no sub-voicemail boxes, the routine may proceed directly to operation 330, described below. On the other hand, if multiple voicemail boxes are associated with the called wireless telephone, then at operation 320 one or more sub-voicemail box options may be provided to the calling party. For example, the calling party may receive a prompt such as "press 1 to leave a message for Joe, press 2 to leave a message for Sarah, press 3 to leave a message for Susan, and so on." As described above with reference to the wireline-to-wireless routing model, according to embodiments, an intelligent call processing component such as the wireless network backend IM server 165 may provide the voicemail box options after a database search to determine those features and/or options that are associated with the called wireless device.

At operation 325, a selection of a particular available voicemail box is received from the calling party. At operation 330, voicemail messages directed to the voicemail box are to be routed to a prescribed wireline voicemail box to allow the recipient of the voicemail message to receive, review and process voicemail messages at a single wireline voicemail box. That is, a determination is made as to whether the selected wireless voicemail box is mapped to an associated wireline voicemail box to which the call may be routed. According to one embodiment, the determination may include querying the wireless telephone system (e.g., querying the web services system 195) for one or more instructions for processing calls directed to the called wireless telephone.

At operation 330, signaling from the wireless telephone network 150 causes the incoming call to be routed to a prescribed wireline voicemail box via the wireline network backend 115 associated with the called party. According to one embodiment, a wireline telephone directory number for the wireline voicemail box associated with the called party may be retrieved from via the web services 195, and the call may be routed to the designated wireline voicemail box by the wireless telephone network 150 by placing a call from the calling party to the wireline voicemail box in the same manner in which the wireless network 150 would process any call from any wireless telephone to a wireline network number. For example, if the calling party desires to leave a voicemail message for a particular voicemail box associated with the called wireless device, signaling from the wireless telephone network 150 may cause the incoming call to be directed to a wireline voicemail box at the wireline network backend associated with a wireline telephone 105, 135 operated by the desired called party.

At operation 335, the incoming call is routed to the wireline voicemail box associated with the selected voicemail box. At operation 340 a voicemail message from the calling party is received at the designated wireline voicemail box.

At operation 343, the called party may review messages left in his/her wireline voicemail box for calls place to both his wireline telephone 135 and to his/her corresponding wireless telephone, and thus the called party does not have to access two separate voicemail boxes. In addition, a parent and/or supervisor of the called party may exercise parental and/or supervisory controls over voice messages routed to one or more wireline voicemail boxes in the same manner as described above for wireless voicemail boxes. One form of parental and/or supervisory control may be in the form of providing a parent or supervisor access to the wireline voicemail boxes to allow the parent and/or supervisor to review voicemail messages left for other members of the parent's household, other members of a supervisor's business, and the like, as described above for wireless voicemail boxes. According to another embodiment, parental and/or supervisory control may be exercised in a manner that allows the parent and/or supervisor to dictate when and from whom voicemail messages may be directed to the wireline voicemail boxes of supervised household members and/or employees as described above for wireless voicemail boxes.

In addition, as described above with reference to FIGS. 1 and 2, text messages directed to the wireless telephones 140, 160, 175, 180 supervised by a given parent and/or supervisor may be automatically converted to audio or speech files using a text to speech converter 190. The text messages transformed to audio or speech files may be deposited in the wireline voicemail boxes associated with the supervised wireline voicemail boxes, and the parent and/or supervisor may thus review deposited text messages in the same manner as he/she may review and supervise deposited voice messages.

As described above, according to another embodiment, when a call is received at a wireless telephone and the called party may not be reached, instead of routing the call to the called party's wireline voicemail box, the call may be routed to the called party's wireline telephone 105, 135 to allow the called party to take the call. This allows the called party to seamlessly receive calls at the alternate device without releasing the wireline telephone number, and it allows the called party to control from whom and when calls may be routed to the wireline device. For example, if the called party is a professional, such as a physician, the called party may allow certain calls directed to his/her wireless telephone to be routed to his/her home wireline telephone.

Referring then back to operation 320, in addition to providing one or more voicemail boxes for receiving voice messages directed to called parties, in accordance with embodiments of the present invention, a calling party may also be provided with options for connecting to a desired called party at an alternate telephone device, for example, at the desired called party's wireline telephone 105, 135. For example, a prompt may be provided such as "to connect to John, press 4." As should be understood, the called parties may provide instructions to the wireless telephone network 150 and to the wireline network 110 for processing such calls in the same manner as described above for processing voicemail messages. That is, the called parties may communicate with the wireline and wireless networks 110, 150 for providing call processing instructions.

At operation 344, a determination is made as to whether the call may be routed to the desired contact as selected by the calling party. For example, the desired called party may have provided call processing setup instructions to the wireless telephone network 150 that no calls should be routed to the desired called party wireline telephone 135 after 9:00 p.m., or the desired called party may have instructed the wireless telephone network that calls should not be routed to the desired called party's wireline telephone during business hours when all incoming calls should be directed to the called party's wireless telephone only. Alternatively, the desired called party may have provided the wireline telephone network 110 with a restrictive list of calling parties from whom calls may be routed to the called party's wireless telephone 160 according to embodiments described herein.

At operation 344, a determination is made as to whether the incoming call may be routed to the desired called party's wireline telephone. If a call from the particular calling party may not be routed as selected, or if a call at the time of the incoming call may not be routed to the desired called party according to instructions provided to the wireless telephone network by the desired called party, the routine proceeds to operation 340 where the calling party may leave a voicemail message for the desired called party, as described above. If the call from the calling party may be routed to the desired called party, then the routine proceeds to operations 345, 350 and 360, and the incoming call is routed to the desired called party at the desired called party's wireline telephone 160.

Thus, as described herein, called parties may instruct the wireline telephone network 110 to route incoming voicemail messages directed to wireline voicemail boxes to voicemail boxes associated with their wireless telephone devices so that received voicemail messages for both wireline telephones and wireless telephones may be received, reviewed, and processed via a single unified voicemail box. Alternatively, voicemail messages and calls directed to wireless telephones/devices may be routed to prescribed wireline voicemail boxes. In addition, parental and/or supervisory control may be exercised over voicemail messages routed to wireless and wireline voicemail boxes for persons under the charge of the parents and/or supervisors. Also, in addition to routing incoming voicemail messages to designated wireless or wireless voicemail boxes, incoming calls may be routed to wireless or wireline telephone devices of desired called parties so that calling parties receive a seamless calling experience for reaching desired called parties.

Although described in combination with a wireline telephone network, a wireless telephone network, and devices associated therewith, in alternative embodiments, the invention may be used in combination with any number of computer systems, such as in desktop environments, laptop or notebook computer systems, multiprocessor systems, microprocessor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of processing calls in a hybrid communication voicemail system, in which a user of both wireline and wireless telephones may check voicemail messages at a desired voicemail box, the method processing calls to a wireline telephone system via a wireless telephone system, comprising:

receiving a call from a calling party at a wireline telephone directed to a called party;

determining when if the call is not answered at the wireline telephone, providing two or more options for processing the call, wherein the two or more options for processing the call including providing a wireless telephone available for routing the call and providing a wireless voicemail box associated with the wireless telephone that is available for receiving a voicemail message from the calling party;

receiving a selection of a call processing option;

in response to receiving a selection of the call processing option for routing the call to the wireless voicemail box associated with the wireless telephone, determining whether the wireless voicemail box associated with the wireless telephone is mapped by querying the wireline telephone system database for one or more instructions for processing specialized calls directed to the wireline telephone, and if the wireless voicemail box associated with the wireless telephone is mapped then routing the call to the wireless voicemail box associated with the wireless telephone to receive a voicemail message from the calling party; and in response to receiving a selection of a call processing option for routing the call to the wireless telephone, querying the wireline telephone system database for one or more instructions for processing specialized calls directed to wireline telephone to determine when to pass the calls to the wireless telephone, and routing the call to the wireless telephone consistent with the one or more instructions.

2. The method of claim 1, wherein providing two or more options for processing the call includes providing a second wireless voicemail boxes associated with a second wireless telephone that are available for receiving a voicemail message from the calling party.

3. The method of claim 1, wherein when the call is not answered at the wireless telephone, determining whether to pass the call to the wireless voicemail box associated with the wireless telephone.

4. The method of claim 1, wherein allowing a review of the voicemail message received at the wireless voicemail box includes allowing a third party access to the wireless voicemail box to review the voicemail message received at the wireless voicemail box.

5. The method of claim 4, wherein prior to allowing a review of the voicemail message received at the wireless voicemail box by a supervisor of the called party, determining whether the supervisor of the called party is authorized to review the voicemail message received at the wireless voicemail box.

6. The method of claim 1, wherein providing two or more options for processing the call includes providing a designation of a second wireless telephone available for routing the call.

7. The method of claim 6, wherein when the call is not answered at the wireless telephone, determining whether to pass the call to a selected designated wireless telephone.

8. The method of claim 1, further comprising receiving one or more text messages directed to a wireless telephone associated with the wireless voicemail box;

transforming the received one or more text messages directed to the wireless telephone associated with the wireless voicemail box to one or more audio files; and storing the one or more audio files in the wireless voicemail box.

9. The method of claim 8 further comprising allowing a review of the one or more audio files stored in the wireless voicemail box.

10. The method of claim 9 further comprising allowing a review of the one or more audio files stored in the wireless voicemail box by a supervisor of a user of the wireless telephone to which the one or more text messages are directed.

11. A method of processing calls in a hybrid communication voicemail system, in which a user of both wireline and wireless telephones may check voicemail messages at a desired voicemail box, the method processing calls to a wireline telephone system via a wireless telephone system, comprising:

receiving a call from a calling party at a wireline telephone directed to a called party;

determining when the call is not answered at the wireline telephone, providing two or more options for processing the call, the two or more options for processing the call including providing a designation of an wireless telephone available for routing the call and providing a wireless voicemail box that is available for receiving a voicemail message from the calling party;

receiving a selection of a call processing option;

in response to receiving a selection of a call processing option for routing the call to the wireless voicemail box, determining whether the wireless voicemail box associated with the wireless telephone is mapped by querying the wireline telephone system database for one or more instructions for processing specialized calls directed to the wireline telephone, and if the wireless voicemail box associated with the wireless telephone is mapped then routing the call to the wireless voicemail box; and in response to receiving a selection of a call processing option for routing the call to a wireless telephone of the called party, determining whether a call is routable to the wireless telephone of the called party at the time of receiving a call from a calling party at a wireline telephone directed to a called party by querying the wireline telephone system database containing one or more specialized call processing instructions of the called party, and if the call is routable to the wireless telephone of the called party at the time of receiving a call from a calling party, routing the call to the called party at the wireless telephone of the called party.

12. The method of claim 1, further comprising:

receiving a voicemail message from the calling party at the wireless voicemail box from the calling party; and allowing a review of the voicemail message from the calling party.

13. The method of claim 11, wherein providing two or more options for processing the call includes providing a second wireless voicemail box associated with the second wireless telephone that are available for receiving a voicemail message from the calling party.

14. The method of claim 11, wherein when the call is not answered at the wireless telephone, determining whether to pass the call to the wireless voicemail box associated with the wireless telephone.

15. The method of claim 11, further comprising receiving one or more text messages directed to a wireless telephone associated with the wireless voicemail box;

transforming the received one or more text messages directed to the wireless telephone associated with the wireless voicemail box to one or more audio files; and storing the one or more audio files in the wireless voicemail box.

16. The method of claim 15, further comprising allowing a review of the one or more audio files stored in the wireless voicemail box.

17. The method of claim 15, further comprising allowing a review of the one or more audio files stored in the wireless voicemail box by a supervisor of a user of the wireless telephone to which the one or more text messages are directed.

18. A method of processing calls in a hybrid communication voicemail system, in which a user of both a wireline telephone and a wireless telephone may check voicemail messages at a desired voicemail box, the method processing calls to a wireline telephone system via a wireless telephone system, comprising:

receiving a call from a calling party at a wireline telephone directed to a called party;

determining when the call is not answered at the wireline telephone, and if the call is not answered then providing one or more options for processing the call, including an option for routing the call to a wireless voicemail box associated with the wireless telephone;

receiving a selection of a call processing option for routing the call to the wireless voicemail box;

determining whether the call is routable to the wireless voicemail box associated with the wireless telephone, including determining whether the wireless voicemail box associated with the wireless telephone is mapped by querying the wireline telephone system database for one or more instructions for processing specialized calls directed to the wireline telephone; and if the wireless voicemail box associated with the wireless telephone is mapped then routing the call to the wireless voicemail box associated with the wireless telephone.

19. The method of claim 18, wherein providing or more options for processing the call includes providing a second wireless voicemail box associated with a second wireless telephone that is available for receiving a voicemail message from the calling party.

20. The method of claim 18, wherein when the call is not answered at the wireless telephone, determining whether to pass the call to the wireless voicemail box associated with the wireless telephone.

* * * * *

UNITED STATES PATENT AND TRADEMARK OFFICE
CERTIFICATE OF CORRECTION

PATENT NO.      : 8,457,602 B2                                            Page 1 of 1
APPLICATION NO. : 12/941327
DATED           : June 4, 2013
INVENTOR(S)     : Gravino et al.

It is certified that error appears in the above-identified patent and that said Letters Patent is hereby corrected as shown below:

In the Claims:

Col. 13, line 55, claim 1: "when if the call" should read --when the call--

Col. 14, line 13, claim 1: "directed to wireline telephone" should read --directed to the wireline telephone--

Col. 14, line 20, claim 1: "wireless voicemail boxes" should read --wireless voicemail box--

Col. 16, line 9, claim 17: "claim 15," should read --claim 16,--

Signed and Sealed this
First Day of April, 2014

Michelle K. Lee
*Deputy Director of the United States Patent and Trademark Office*